United States Patent [19]
Moriguchi et al.

[11] Patent Number: 5,296,008
[45] Date of Patent: Mar. 22, 1994

[54] METHOD FOR MANUFACTURING A CUTTING TOOL INSERT MADE OF A SILICON NITRIDE BODY

[75] Inventors: Hideki Moriguchi; Mitsunori Kobayashi; Toshio Nomura, all of Hyogo; Tosiaki Nakamata, Osaka, all of Japan

[73] Assignee: Sumitomo Electric Industries, Ltd., Osaka, Japan

[21] Appl. No.: 810

[22] Filed: Jan. 5, 1993

Related U.S. Application Data

[63] Continuation of Ser. No. 830,127, Jan. 31, 1992, abandoned.

[30] Foreign Application Priority Data

Feb. 15, 1991 [JP] Japan ................. 3-022370
Feb. 28, 1991 [JP] Japan ................. 3-034695

[51] Int. Cl.$^5$ .......................................... C04B 41/53
[52] U.S. Cl. .................................. 51/295; 51/307; 51/309; 264/23; 264/67; 501/97; 501/98
[58] Field of Search ............... 501/97, 98; 264/23, 264/67; 51/307, 309, 295

[56] References Cited

U.S. PATENT DOCUMENTS

| | | | |
|---|---|---|---|
| 4,381,931 | 5/1983 | Hunold | 51/309 |
| 4,406,669 | 9/1983 | Sarin et al. | 501/98 |
| 4,416,670 | 11/1983 | Sarin et al. | 501/97 |
| 4,449,989 | 5/1984 | Sarin et al. | 501/98 |
| 4,578,087 | 3/1986 | Tanaka et al. | 501/97 |
| 4,745,022 | 5/1988 | Miyake et al. | 501/97 |
| 4,881,950 | 11/1989 | Bhat et al. | 501/97 |

FOREIGN PATENT DOCUMENTS

| | | | |
|---|---|---|---|
| 0175041 | 3/1986 | European Pat. Off. | 501/97 |
| 2940629 | 4/1981 | Fed. Rep. of Germany | 501/97 |
| 48-7486 | 3/1973 | Japan . | |
| 55-95679 | 7/1980 | Japan | 501/97 |
| 57-17466 | 1/1982 | Japan | 501/97 |
| 57-205376 | 12/1982 | Japan | 501/97 |
| 58-185477 | 10/1983 | Japan | 501/97 |
| 59-6274 | 2/1984 | Japan . | |
| 60-180962 | 9/1985 | Japan | 501/97 |
| 61-19367 | 5/1986 | Japan . | |
| 61-274803 | 12/1986 | Japan . | |
| 62-13430 | 3/1987 | Japan . | |
| 62-30152 | 6/1987 | Japan . | |
| 2-164773 | 6/1990 | Japan . | |

*Primary Examiner*—James Derrington
*Attorney, Agent, or Firm*—W. G. Fasse; W. F. Fasse

[57] ABSTRACT

A tool or tool insert is formed of a silicon nitride sintered body which contains silicon nitride as well as a sintering aid and is sintered under a pressurized atmosphere. Freely grown $\beta$-Si$_3$N$_4$ including $\beta'$-SIALON is removed from its sintering surface by steps other than grinding. A tool of a surface-coated silicon nitride sintered body is formed by coating the surface of a base material, which is formed in a manner similar to the above, with a layer of carbide of Ti or the like having a thickness of 0.1 to 10 $\mu$m and/or a layer of Al$_2$O$_3$ having a thickness of 0.4 to 10 $\mu$m. Tools or inserts formed by a silicon nitride sintered body and the same tools provided with a surface coating have an excellent wear resistance as well as toughness and can be manufactured at a low cost since grinding is avoided.

9 Claims, 8 Drawing Sheets

BLASTED SURFACE OF
BASE MATERIAL     x4800

BLASTED SURFACE OF
BASE MATERIAL     x1200

GROUND SURFACE OF
BASE MATERIAL     x4800

GROUND SURFACE OF
BASE MATERIAL     x1200

SINTERED SURFACE OF
BASE MATERIAL   x4800

SINTERED SURFACE OF
BASE MATERIAL   x1200

BLASTED SURFACE OF
BASE MATERIAL       x4800

BLASTED SURFACE OF
BASE MATERIAL       x1200

BARRELED SURFACE OF
BASE MATERIAL     x4800

BARRELED SURFACE OF
BASE MATERIAL     x1200

COATED GROUND SURFACE
OF BASE MATERIAL     x4800

COATED GROUND SURFACE
OF BASE MATERIAL     x1200

COATED SINTERED SURFACE
OF BASE MATERIAL           x4800

COATED SINTERED SURFACE
OF BASE MATERIAL           x1200

COATED STATE OF
BLASTED BASE MATERIAL    x4800

COATED STATE OF
BLASTED BASE MATERIAL    x1200

COATED STATE OF
BARRELED BASE MATERIAL    x4800

COATED STATE OF
BARRELED BASE MATERIAL    x1200

METHOD FOR MANUFACTURING A CUTTING TOOL INSERT MADE OF A SILICON NITRIDE BODY

This application is a continuation of application Ser. No. 07/830,127, filed on Jan. 31, 1992, now abandoned.

FIELD OF THE INVENTION

The present invention relates to a cutting tool insert made of a surface-coated silicon nitride sintered body which has an excellent wear resistance and toughness at least in that portion of the insert which performs a cutting operation by contacting a work piece.

BACKGROUND INFORMATION

In the field of cutting tool inserts and wear-resistant tools, collectively referred to as "tools" herein, an attempt has generally been made to substitute a ceramic tool or insert for a high-speed steel tool. A cemented carbide tool or a coated tool, and an $Al_2O_3$-based tool were first developed in the 1950s. However, these early tools were not brought into practice at the outset since their toughness was too small. Thereafter an improvement was made in order to increase the toughness of the tool by adding TiC, $ZrO_2$ (Japanese Patent Publication No. 59-6274 (1984)), SiC whiskers (Japanese Patent Laying-Open No. 61-274803 (1986)), whereby the tool could be practically applied to finish cutting of cast iron or the like. However, it was impossible to use the tool for rough cutting and intermittent cutting since its toughness was still insufficient resulting in an inferior reliability. On the other hand, a silicon nitride sintered body can be widely applied to rough and/or finish cutting, wet cutting etc. of cast iron with high reliability since a silicon nitride sintered body has a higher toughness compared with an $Al_2O_3$ sintered body and a high thermal shock resistance with a small thermal expansion coefficient. Japanese Patent Publication Nos. 6-19367 (1986) and 62-13430 (1987) have proposed tools which are obtained by coating the surfaces of silicon nitride sintered bodies with a Ti compound or $Al_2O_3$ thereby improving the wear resistance of the silicon nitride sintered body and provide it with excellent characteristics.

As to such a silicon nitride sintered body, extensive studies have been made in relation to a sintering assistant, for the purpose of improving the strength, since silicon nitride is a highly covalent compound which has a large ratio of grain boundary energy to surface energy as compared to ionic and metallic crystals which large ratio causes an extremely slow self-diffusion, whereby silicon nitride is hardly sintered at a high temperature due to decomposition and evaporation. Thus, there has been developed a technique of forming a glass phase having a low melting point with a sintering assistant such as MgO, $Y_2O_3$, $Al_2O_3$, $ZrO_2$, AlN, CaO, $CeO_2$, $SiO_2$ or the like for obtaining a dense sintered body by liquid phase sintering. In the history of the development of such sintering assistants, the development of $Y_2O_3$ as a sintering assistant was extremely important because not only the sintered body was densified but also silicon nitride crystal grains were developed in columnar shapes to improve the strength of the silicon nitride sintered body by a theory of fiber reinforcement (see Japanese Patent Publication No. 48-7486 (1973)). In this sintering mechanism, $\alpha$-$Si_3N_4$ is dissolved in a molten glass phase which has been formed at a high temperature, deposited as $\beta$-$Si_3N_4$ (or $\beta'$-SIALON) by a dissolution and/or redeposition phenomenon, and grown in a C-axis direction of a hexagonal system in the presence of $Y_2O_3$, to form columnar silicon nitride particles.

Due to such technical development, it has been made possible to improve the strength of silicon nitride, which is now practically applied to make ceramic tools including tool inserts capable of carrying out rough cutting, intermittent cutting and rough milling of cast iron.

Such development of the sintering assistant and employment of gaseous nitrogen pressure sintering have also enabled sintering of silicon nitride in a pressurized nitrogen atmosphere. Previously, the sintering generally took place only by a hot pressing method. Further, it has been made possible to form a sintered body having a complicated configuration, in a near "net" shape, i.e., in a shape substantially close to that of the final product.

However, although it has been made possible to work a sintered body into a near final shape by the aforementioned technical development, there has not yet been developed a product of a silicon nitride tool or insert which is directly formed with a sintered surface capable of functioning as a cutting edge similarly to a cemented carbide or cermet tool formed with a directly coated sintered surface. Rather, a silicon nitride tool or insert requires grinding to obtain its finished shape under the present circumstances. Thus, the strength of the sintered body is reduced by cracks resulting from flaws which are caused during grinding, and the manufacturing cost is increased since silicon nitride is extremely hard to work making the grinding operation difficult. FIGS. 1A and 1B are microphotographs taken by a scanning electron microscope (hereinafter referred to as "SEM"), showing the state of a ground surface of a base material.

Although an attempt has been made to mold silicon nitride into a desired shape and finish the same without any grinding or through an after treatment with a low-cost method other than grinding, the so formed product deteriorated in strength and had a reduced wear resistance due to the presence of abnormal phases formed on the surface of the sintered body. Such abnormal phases appearing on the surface of the sintered body may be formed by sublimation and/or decomposition of $Si_3N_4$, scattering of grain boundary glass phases and the like. It has been proposed to solve this problem by oxidizing the surface of a silicon nitride sintered body and forming a film which is mainly composed of silicon dioxide for covering abnormal phases appearing on the surface of the sintered body, thereby drawing out characteristics present in the silicon nitride sintered body itself (Japanese Patent Laying-Open No. 2-164773 (1990)). When such a sintered body is used as a tool or tool insert in practice, however, depositions are easily caused between the tool and a workpiece due to silicate glass phases having a low melting point which are formed on the surface of the sintered body, whereby the wear resistance is reduced. There has also been proposed a method of sintering a vessel of a specific material containing a pressed body of silicon nitride made of silicon nitride group powder held within a graphite crucible in a state buried in the silicon nitride group powder thereby obtaining a sintered material which can be applied to practical use in the sintered state (Japanese Patent Publication No. 62-30152 (1987)). On the surface of the so formed sintered body, however, freely grown columnar crystal grains of silicon nitride are formed as shown in FIGS. 2A and 2B, similarly to the case of an ordinary normal pressure sintering method. The columnar silicon nitride crystal grains, which are of $Si_3N_4$ (or $\beta'$-SIALON), are intertwined in the sintered body to improve its strength by the mechanism of fiber reinforcement as described above, thereby enabling the tool or the insert to perform cutting work, such as rough milling or intermittent cutting of cast iron. This phenomenon is specific to a silicon nitride sintered body which is improved in strength, and it is not observed in a sintered surface of a cermet or cemented carbide tool.

The crystal grains of $\beta$-$Si_3N_4$ or $\beta'$-SIALON freely grown on the surface of the sintered body are instable due to the free or random growth, and merely fixed in place by glass phases mainly composed of a sintering aid located at end portions of the columnar crystal grains. Therefore, the crystal grains easily drop out when external stress is applied to the sintered body, whereby the surface roughness of the sintered body is increased due to clearances defined between the columnar particles. When a sintered body having such a surface is used as a tool or insert, therefore, its wear resistance is reduced and its strength is deteriorated by the columnar crystal grains falling out of the body surface.

In the case of a surface-coated silicon nitride sintered body which is used as a tool or insert, external stress is applied to a film covering the surface of its base material, to easily cause the above mentioned dropping phenomenon, while its surface roughness is increased due to clearance defined between columnar particles, and portions of the coating film become irregular to cause local grain growth, leading to the formation of a massive coating film as shown in FIGS. 5A and 5B.

When a sintered body having such surface phases is used as a tool, therefore, the cutting resistance is disadvantageously decreased and the coating film easily peels off to damage the effect of the coating. Such a problem is specific to a tool of a surface-coated silicon nitride sintered body which is improved in strength by columnar $\beta$-$Si_3N_4$ (or $\beta'$-SIALON), and is not observed in a film coated on a cemented carbide tool. Further, in a silicon nitride sintered body, this problem has not been caused since a ground sintered body has been coated in general.

SUMMARY OF THE INVENTION

It is an object of the present invention to provide a tool or insert of a silicon nitride sintered body and a tool or insert of a surface-coated silicon nitride sintered body, each of which has excellent wear resistance as well as toughness by improving the surface state of the silicon nitride sintered body without grinding.

A tool or insert of a silicon nitride sintered body for attaining the aforementioned object is obtained according to the invention by removing columnar $\beta$-$Si_3N_4$ or $\beta'$-SIALON freely grown on the surface of a silicon nitride sintered body, which is improved in strength by $\beta$-$Si_3N_4$ or $\beta'$-SIALON present in its interior.

In a preferred embodiment of the present invention, blasting, barreling or a treatment through ultrasonic vibration is employed as a means for removing freely grown columnar $\beta$-$Si_3N_4$ or $\beta'$-SIALON from the surface without any grinding, thereby enabling a low-cost treatment which does not cause any flaws on the surface.

In another aspect of the present invention, it has been found possible to effectuate characteristics which are originally provided in a silicon nitride sintered body by removing columnar $\beta$-$Si_3N_4$ or $\beta'$-SIALON freely grown on the surface of the silicon nitride sintered body whose strength is improved by $\beta$-$Si_3N_4$ or $\beta'$-SIALON in its interior and coating the surface with a single or composite layer of at least one component selected from carbide, nitride, carbo-nitride and nitride carbonate of Ti, said layer having a thickness of at least 0.1 $\mu$m and not more than 10 $\mu$m and/or a layer of $Al_2O_3$ having a thickness of at least 0.4 $\mu$m and not more than 10 $\mu$m. Such a surface-coated silicon nitride sintered body is suitable for use as a tool or insert.

The coating films for the tool or insert of the silicon nitride sintered body are restricted in thickness for the following reasons: The single or composite coating layer of at least one of carbide, nitride, carbo-nitride and nitride carbonate of Ti is adapted to improve the abrasive wear resistance of the silicon nitride sintered body as well as to increase the adhesion strength between the silicon nitride and $Al_2O_3$ when the coating film contains $Al_2O_3$, thereby effectively suppressing an abnormal growth of $Al_2O_3$ crystal grains However, such effects are reduced if the thickness of the coating film is not more than 0.1 $\mu$m, while the toughness of the tool is reduced if the thickness is in excess of 10 $\mu$m. A film of $Al_2O_3$ can be expected to improve the wear resistance of the silicon nitride sintered body. However, this effect is reduced if the thickness is not more than 0.4 $\mu$m, while $Al_2O_3$ crystal grains are made coarse if the thickness exceeds 10 $\mu$m, to again disadvantageously reduce the wear resistance.

It is effective to coat the outermost surface of the sintered body with titanium nitride in order to facilitate the identification of a worn out corner of a tool or insert and to improve the appearance. However, such effects are reduced if the thickness of this film is smaller than 0.1 $\mu$m, while the effects are not particularly increased even if the thickness exceeds 5 $\mu$m, and no industrial effect is attained. An effect of reducing the cutting resistance can also be expected from such coating of titanium nitride.

When the innermost coating layer is made of TiN or TiCN, diffusion of nitrogen, which is contained in the base material of $Si_3N_4$, and TiN or TiCN can be expected. Therefore, it is possible to obtain a coating layer which has a particularly excellent adhesion strength relative to the base material. In this case, the effect of improving the adhesion strength is insufficient if the thickness of the TiN or TiCN layer is smaller than 0.1 $\mu$m, while no further improvement of adhesion strength is expected if the thickness exceeds 1.0 $\mu$m. Therefore, the thickness of the TiN or TiCN film is preferably in a range of 0.1 to 1.0 $\mu$m.

The silicon nitride sintered body employed in the present invention is formed by a well-known method of mold-pressing a mixture of silicon nitride powder and a sintering assistant under a pressure of 1 ton/cm$^2$ and thereafter sintering the same in a nitrogen atmosphere at a temperature of 1700° to 1900° C. under a pressure of the nitrogen atmosphere or performing hot hydraulic pressing after the sintering in a pressurized nitrogen atmosphere. The silicon nitride powder employed in the present invention preferably has an $\alpha$ rate, i.e., a content of $\alpha$-$Si_3N_4$, of at least 90 percent by weight. This is because silicon nitride raw material powder having an $\alpha$ rate of at least 90 percent is preferably employed for obtaining a silicon nitride sintered body having a high strength with intertwined columnar $\beta$-$Si_3N_4$ or $\beta'$-SIALON. The raw material powder of silicon nitride is preferably prepared by imide decomposition, because silicon nitride raw material powder prepared by imide decomposition contains fine particles of high purity, easily dissolved in a liquid phase formed by a sintering assistant. This method facilitates the preparation of a silicon nitride sintered body in which fine particles of $\beta$-Si$_3$N$_4$ or $\beta'$-SIALON having large aspect ratios, are intertwined by a dissolution and/or re-deposition phenomenon.

The sintering aid preferably contains at least 1 percent by weight and not more than 20 percent by weight of at least one of MgO, Y$_2$O$_3$, Al$_2$O$_3$, ZrO$_2$, AlN, CaO, CeO$_2$ and SiO$_2$. Such a sintering aid improves the degree of sintering, so that a dense sintered body can be obtained by sintering in a pressurized nitrogen atmosphere. It is difficult to carry out the pressure sintering in a pressurized atmosphere if the amount of the sintering aid is not more than 1 percent by weight, while the wear resistance of the sintered body is reduced if the amount exceeds 20 percent by weight. Addition of Y$_2$O$_3$ and CeO$_2$ is particularly preferable since silicon nitride crystal grains are brought into columnar crystal states resulting in an improved strength of the sintered body. When 1 to 30 percent by weight of at least one of carbide, nitride, boride and carbo-nitride of Ti is added, the formed sintered body has an improved hardness as well as an improved wear resistance. This effect is reduced if the amount is not more than 1 percent by weight, while the degree of sintering is reduced if the amount exceeds 30 percent by weight.

$\beta$-Si$_3$N$_4$ or $\beta'$-SIALON freely grown on the surface of the formed silicon nitride sintered body can be removed by any low cost method other than grinding. Such surface treatments comprise blasting, barreling, and a treatment through ultrasonic vibration. As to the blasting, Al$_2$O$_3$ of #120 is projected under a pressure of 4 kg/cm$^2$, for example. As to the barreling, water is added to SiC of #120 and the mixture is rotated at 2000 r.p.m., for example. As to the treatment through ultrasonic vibration, an ultrasonic vibrator of 600 W is employed to carry out the treatment in water which contains diamond abrasive grains, for about 3 hours for example. A projector or a medium employed in the blasting or the barreling can be prepared of a ceramic material such as SiC, Al$_2$O$_3$ or the like, or a glass material such as SiO$_2$.

FIGS. 3A and 3B are SEM microphotographs showing the surface of a silicon nitride sintered body from which freely grown columnar silicon nitride particles have been removed by blasting, and FIGS. 4A and 4B are SEM microphotographs showing the surface of a silicon nitride sintered body from which freely grown columnar silicon nitride particles have been removed by barreling. FIGS. 7A, 7B, 8A and 8B are SEM microphotographs showing the surfaces of surface-coated silicon nitride sintered bodies obtained by coating the sintered bodies after the above described surface treatment with TiCN layers of 0.5 $\mu$m, Al$_2$O$_3$ layers of 1.5 $\mu$m and outermost layers of TiN of 0.2 $\mu$m in thickness. It is understood that, in a surface-coated silicon nitride sintered body comprising a base material of a sintered body from which freely grown columnar silicon nitride particles have been removed, the sizes of the crystal grains contained in the coating film are substantially identical to those of the same type of coating film (see FIGS. 5A and 5B) formed on a ground surface (see FIGS. 2A and 2B), however with a remarkable difference compared to those having a coating film directly formed on a sintered surface as shown in FIGS. 6A and 6B. The difference is the fact that a massive coating film has been extremely reduced. This may be because an inhomogeneous core generation of the coating film is hard to occur since the surface has been smoothed by barreling or blasting.

It is possible to decide whether or not columnar silicon nitride particles freely grown on the surface have been removed, by measuring a half-power band width of a diffraction peak of $\beta$-Si$_3$N$_4$ or $\beta'$-SIALON, i.e., the width of an angle of diffraction evaluated when the height of the diffraction peak is halved, by X-ray diffraction, or by lapping and etching a section of a coated portion and thereafter observing the same with a light-optic microscope.

In the surface-coated silicon nitride sintered body according to the invention, the 10 point mean surface roughness Rz of the surface is preferably not more than 3 $\mu$m, assuming that the detection distance is 2.5 mm. If the value Rz is in excess of 3 $\mu$m, columnar $\beta$-Si$_3$N$_4$ (or $\beta'$-SIALON) freely grown on the surface of the sintered body cannot be sufficiently removed and the wear resistance of the tool cannot be much improved. The mean surface roughness Rz is conventionally determined in microns as the spacing between two lines one passing through the third highest peaks and the other line passing through the third deepest valleys along a standardized length of the respective surface.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
FIG. 1A is an SEM microphotograph with a 4800× magnification showing a ground surface of a silicon nitride sintered body.
Figure 1B:
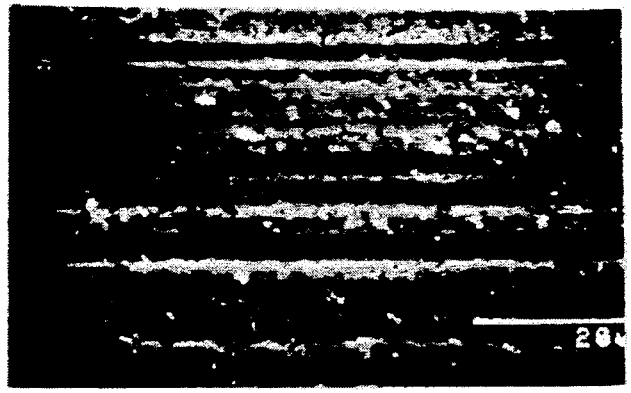
FIG. 1B is an SEM microphotograph showing the same ground surface of the silicon nitride sintered body at a lower magnification of 1200×.
Figure 2A:
FIG. 2A is an SEM microphotograph with a 4800× magnification showing the sintered surface of a silicon nitride sintered body.
Figure 2B:
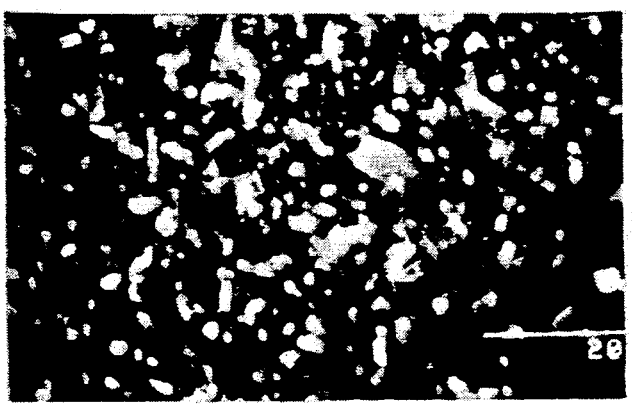
FIG. 2B is an SEM microphotograph showing the same sintered surface of the silicon nitride sintered body at a lower magnification of 1200×.
Figure 3A:
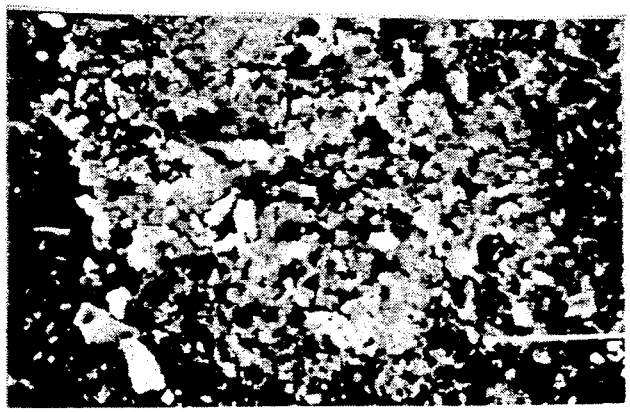
FIG. 3A is an SEM microphotograph with a 4800× magnification showing a blasted surface state of a silicon nitride sintered body.
Figure 3B:
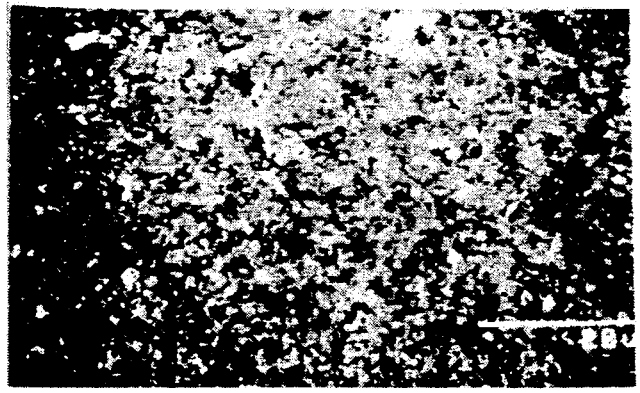
FIG. 3B is an SEM microphotograph showing the same surface as FIG. 3A at a lower magnification of 1200×.
Figure 4A:
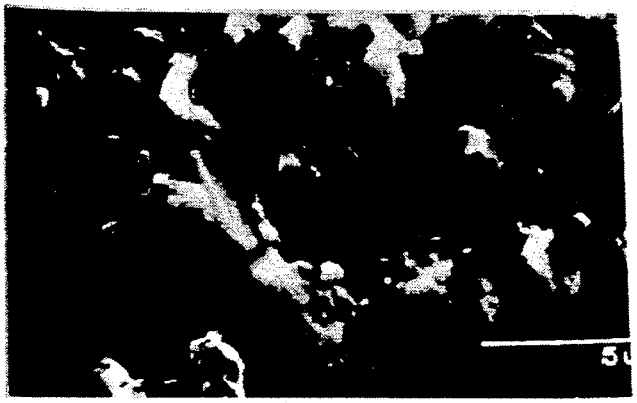
FIG. 4A is an SEM microphotograph with a 4800× magnification showing a barreled surface state of a silicon nitride sintered body.
Figure 4B:
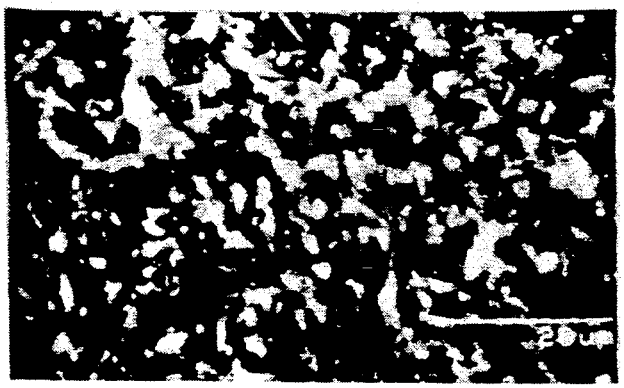
FIG. 4B is an SEM microphotograph showing the same surface as FIG. 4A at a lower magnification of 1200×.
Figure 5A:
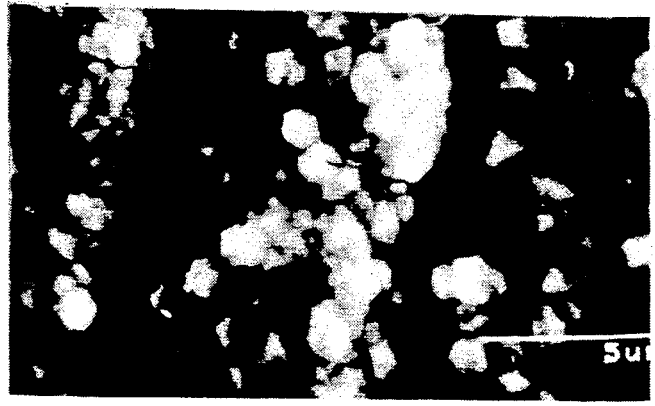
FIG. 5A is an SEM microphotograph with a 4800× magnification showing a coated surface state of a ground base material for a silicon nitride sintered body.
Figure 5B:
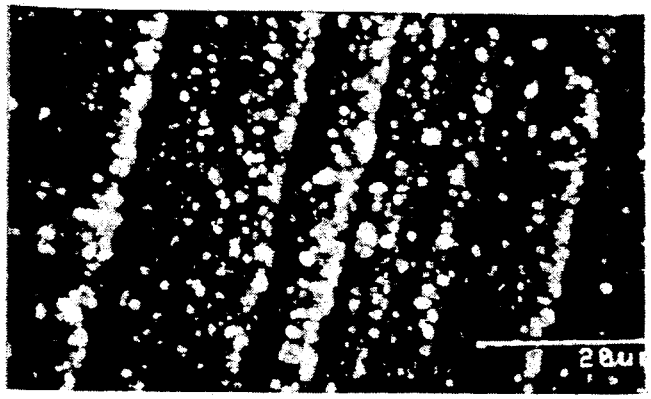
FIG. 5B is an SEM microphotograph showing the same surface as FIG. 5A at a lower magnification of 1200×.
Figure 6A:
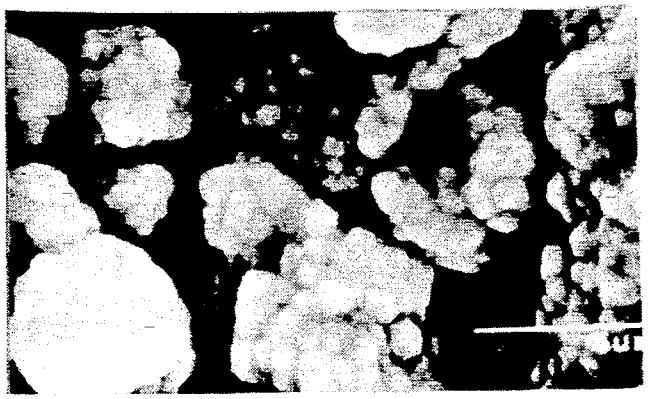
FIG. 6A is an SEM microphotograph with a 4800× magnification showing a coated surface state of a sintered base material for a silicon nitride sintered body.
Figure 6B:
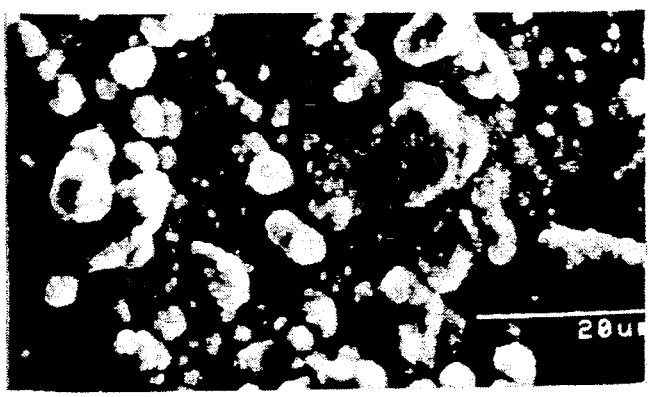
FIG. 6B is an SEM microphotograph showing the same surface as FIG. 6A at a lower magnification of 1200×.
Figure 7A:
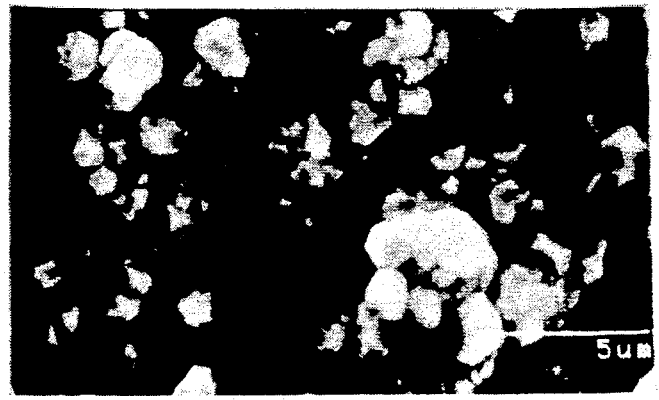
FIG. 7A is an SEM microphotograph with a 4800× magnification showing a coated surface state of a blasted base material for a silicon nitride sintered body.
Figure 7B:
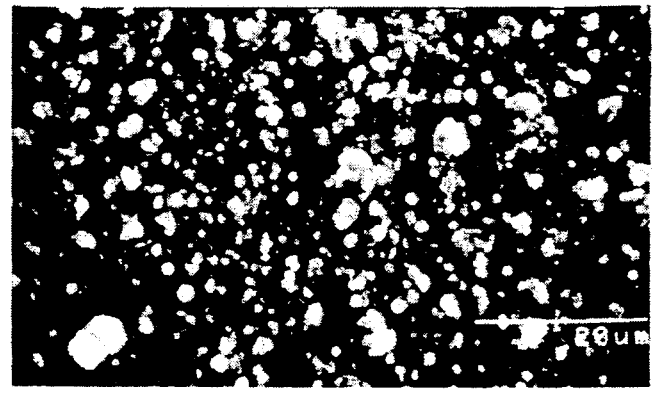
FIG. 7B is an SEM microphotograph showing the same surface as FIG. 7A at a lower magnification of 1200×.
Figure 8A:
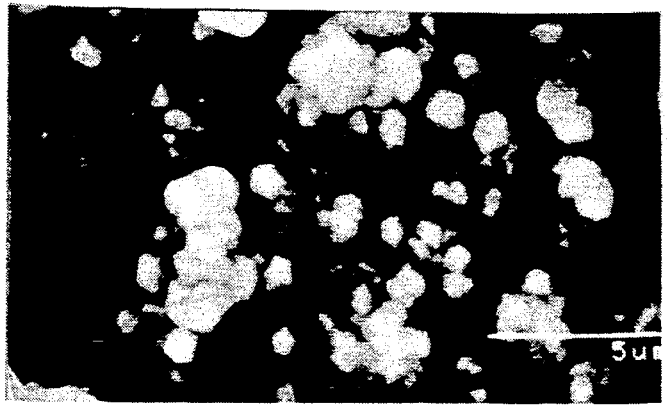
FIG. 8A is an SEM microphotograph with a 4800× magnification showing a coated surface state of a barreled base material for a silicon nitride sintered body.
Figure 8B:
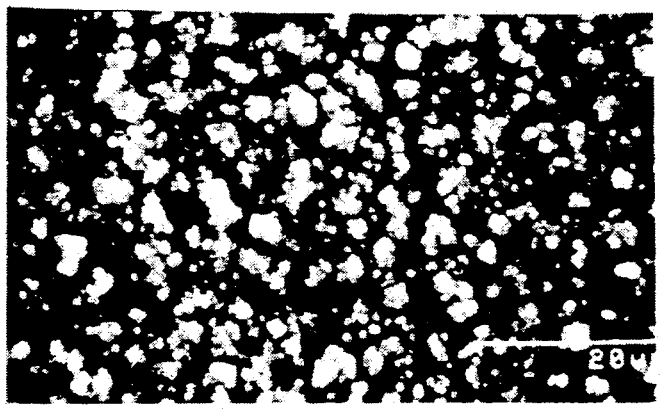
FIG. 8B is an SEM microphotograph showing the same surface as FIG. 8A at a lower magnification of 1200×.

Examples of the present invention will now be described.

EXAMPLE 1

Silicon nitride raw material having a mean particle diameter of 0.4 μm as well as an α crystallization rate of 96 percent and containing 1.5 percent by weight of oxygen was wet-blended with 5 percent by weight of $Y_2O_3$ powder of 0.8 μm in mean particle diameter and 3 percent by weight of $Al_2O_3$ of 0.4 μm in mean particle diameter in ethanol for 100 hours, through a ball mill of nylon and thereafter dried to obtain a mixed powder, which in turn was press-molded under a pressure of 1 ton/cm² in a metallic mold having a tool shape of SNMN120408. The so preformed compact was sintered in a pressure sintering furnace in a gaseous nitrogen atmosphere at a pressure of 5 atm. absolute at 1800° C. for 2 hours, and only a rake face was ground to obtain a silicon nitride sintered body X having the tool shape of SNMN120408. Tool samples A to F listed in the following Table 1 were formed by applying the listed surface treatments to the surface of the silicon nitride sintered body.

TABLE 1

| Sample | Material |
| --- | --- |
| A | Sintered Body X Barreled for 1 minute |
| B | Sintered Body X Barreled for 5 minutes |
| C | Sintered Body X Barreled for 60 minutes |
| D | Sintered Body X Blasted for 10 minutes |
| *E | Sintered Body Oxidized at 1500° C. |
| *F | Untreated Sintered Body X |

Note:
*Comparative Samples out of the scope of the invention

Tools or inserts formed by the so obtained silicon nitride sintered body were subjected to cutting tests under the following conditions:

Cutting Test 1

Workpiece: FC25
Cutting Speed: 600 m/min.
Feed Rate: 0.4 mm/rev.
Depth of Cut: 1.5 mm
Cutting Oil: dry
Cutting Time: 10 min.

Cutting Test 2

Workpiece: FC25
Cutting Speed: 200 m/min.
Feed Rate: 0.2 mm/edge
Depth of Cut: 2.5 mm
Cutting Oil: dry
Cutting Time: 10 min.

Table 2 shows the results of the aforementioned cutting tests. From the results shown in Table 2, it is understood that the samples A to D of the invention have a superior wear resistance and chipping resistance compared to the samples E and F, which are out of the scope of the present invention. In the sample A, the surface of the sintered body was roughened as compared with the samples B to D due to insufficient removal of freely grown $\beta$-$Si_3N_4$ or $\beta'$-SIALON, and the flank wear was relatively increased as the results of the cutting tests show. In the sample E which was prepared by oxidizing the surface of the sintered body, the flank wear was extremely increased as the results of the cutting tests show, although the surface roughness Rz was at the minimum value of 1.5 μm. This may be because the wear resistance of this sample had deteriorated due to a low melting point of the oxide film of silicate glass which was formed on its surface, although the surface was smoothed by oxidation.

TABLE 2

| Sample | Rz (μn) | Results of Cutting Tests Flank Wear Width [mm] | |
| --- | --- | --- | --- |
| | | Test 1 | Test 2 |
| A | **3.8 | 0.23 | 0.21 |
| B | 1.9 | 0.19 | 0.15 |
| C | 1.6 | 0.18 | 0.13 |
| D | 1.4 | 0.16 | 0.12 |
| *E | 1.5 | 0.44 | 0.42 |
| *F | 4.5 | 0.47 | Chipped in 3 minutes |

(Note)
*Comparative Samples out of the scope of the invention
**Out of the preferable range of the invention

EXAMPLE 2

Silicon nitride raw material having a mean particle diameter of 0.4 μm as well as an α crystallization rate of 96 percent and containing 1.5 percent by weight of oxygen was wet-blended with 5 percent by weight of $Y_2O_3$ powder of 0.8 μm in mean particle diameter and 3 percent by weight of $Al_2O_3$ powder of 0.4 μm in mean particle diameter, in ethanol for 100 hours in a ball mill of nylon and thereafter dried to obtain a mixed powder, which in turn was press-molded under 1 ton/cm² in a metallic mold having a tool shape of SNMN120408. The so formed compacts were sintered in a pressure sintering furnace in gaseous nitrogen at a pressure of 5 atm. absolute at 1800° C. for 2 hours and only the rake faces were ground, to obtain silicon nitride sintered bodies Y having the tool shape of SNMN120408.

The surface of the sintered body X was coated with TiCN film having a thickness of 0.5 μm, an $Al_2O_3$ film having a thickness of 1.5 μm and a TiN film having a thickness of 0.2 μm, in this order, by CVD, to obtain a coated silicon nitride sintered body Z.

The sintered bodies Y were subjected to treatments shown in Table 3 and coated in a similar manner to the aforementioned coated silicon nitride sintered body Z, thereby preparing samples G to M.

TABLE 3

| Sample | Material |
| --- | --- |
| G | Sintered Body Y Barreled for 1 Minute and Coated on Its Surface |
| H | Sintered Body Y Barreled for 5 Minutes and Coated on Its Surface |

TABLE 3-continued

| Sample | Material |
| --- | --- |
| I | Sintered Body Y Barreled for 60 Minutes and Coated on Its Surface |
| J | Sintered Body Y Blasted for 10 Minutes and Coated on Its Surface |
| *K | Sintered Body Y Oxidized at 1500° C. and Coated on Its Surface |
| *L | Untreated Sintered Body Y |
| *M | Coated Silicon Nitride Sintered Body Z |

(Note)
*Comparative Samples out of the scope of the invention

Tools or inserts formed of the so obtained silicon nitride sintered bodies were subjected to cutting tests under the following conditions:
Workpiece: FC25
Cutting Speed: 600 m/min.
Feed Rate: 0.4 mm/rev.
Depth of Cut: 1.5 mm
Cutting Oil: dry
Cutting Time: 10 min.

Table 4 shows the results of these cutting tests. From the results shown in Table 4, it is understood that the samples G to J of the invention are superior in wear resistance compared to the samples K to M, which are out of the scope of the present invention. In the sample G, the surface of the sintered body was roughened as compared to the samples H to J due to an insufficient removal of freely grown $\beta$-$Si_3N_4$ or $\beta'$-SIALON, and the flank wear was relatively increased as the results of the cutting test show. In the sample K which was prepared by oxidizing the surface of the sintered body and coating the same, the flank wear was very much increased as the results of the cutting test show although the surface roughness Rz was at the minimum value of 1.5 $\mu$m. This may be because its wear resistance was deteriorated due to a low melting point of the oxide film of silicate glass which was formed on the surface, although the surface was smoothed by oxidation.

TABLE 4

| Sample | Rz ($\mu$m) | Results of Cutting Test Flank Wear Width [mm] |
| --- | --- | --- |
| G | **4.0 | 0.22 |
| H | 2.0 | 0.13 |
| I | 1.7 | 0.09 |
| J | 1.5 | 0.08 |
| *K | 1.5 | 0.44 |
| *L | 4.5 | 0.47 |
| *M | 5.8 | 0.45 |

(Note)
*Comparative Samples out of the scope of the invention
**Out of the preferable range of the invention

EXAMPLE 3

Base materials were formed by the sintered body H which was prepared in Example 2 and coated with layers shown in Table 5. Table 6 shows values of adhesion strength of these samples.

TABLE 5

| Sample | Structure and Thickness of Coating Layer Inner Layer - Outer Layer [$\mu$m] |
| --- | --- |
| N | TiN(0.5) - $Al_2O_3$(1.5) - TiN(0.2) |
| O | TiCN(0.5) - $Al_2O_3$(1.5) - TiN(0.2) |
| P | TiC(0.5) - $Al_2O_3$(1.5) - TiN(0.2) |
| Q | $Al_2O_3$(1.5) - TiN(0.2) |

TABLE 6

| Sample | Adhesion Strength |
| --- | --- |
| N | 600 |
| O | 550 |
| P | 250 |
| Q | 400 |

In order to measure the adhesion strength, a constant load was applied to a diamond cone having a tip radius of 200 $\mu$m and a vertical angle of 120° for scratching a distance of 3 mm, to evaluate a load causing separation, as adhesion strength.

From the results shown in Table 6, it is understood that the coating layers are improved in adhesion strength when the innermost layers are made of TiN or TiCN.

EXAMPLE 4

The samples prepared in Example 3 were subjected to cutting tests under the same conditions as Example 2. Table 7 shows the results.

TABLE 7

| Sample | Results of Cutting Test (Flank Wear Width [mm]) |
| --- | --- |
| N | 0.16 |
| O | 0.13 |
| P | 0.30 |
| Q | 0.21 |

Although the present invention in detail, it is clearly understood that the same is by way of illustration and example only and is not to be taken by way of limitation, the spirit and scope of the present invention being limited only by the terms of the appended claims.

What is claimed is:

1. A method for producing a cutting tool of a silicon nitride sintered body having a cutting edge, comprising the following steps: preparing a silicon nitride sintered body containing silicon nitride and at least one sintering assistant selected from the group consisting of MgO, $Y_2O_3$, $Al_2O_3$, $ZrO_2$, AlN, CaO, $CeO_2$, and $SiO_2$, whereby said sintered body includes a member selected from the group consisting of columnar $\beta$-$Si_3N_4$ and $\beta'$-SIALON, and performing on said sintered body a surface treatment with abrasive grains, said surface treatment being selected from the group consisting of blasting, barreling, and ultrasonic vibration, whereby said columnar $\beta$-$Si_3N_4$ and $\beta'$-SIALON is removed at least from said cutting edge, whereby said cutting edge is free of grinding grooves for an improved cutting wear resistance.

2. The method of claim 1, comprising applying said surface treatment step to a sintered surface of said body having a 10 point mean surface roughness Rz of not more than 3 $\mu$m.

3. The method of claim 2, wherein said silicon nitride sintered body is so prepared that said sintered body contains 1 to 30 percent by weight of at least one component selected from the group consisting of carbide, nitride, carbo-nitride and boride of Ti, and wherein said sintering assistant is present within the range of 1 to 20 wt. %.

4. A method for producing a cutting tool of a silicon nitride sintered body having a cutting edge, comprising the following steps: preparing a silicon nitride sintered body containing silicon nitride and at least one sintering assistant selected from the group consisting of MgO, $Y_2O_3$, $Al_2O_3$, $ZrO_2$, AlN, CaO, $CeO_2$, and $SiO_2$, whereby said sintered body includes a member selected from the group consisting of columnar $\beta$-$Si_3N_4$ and $\beta'$-SIALON, removing said $\beta$-$Si_3N_4$ and $\beta'$-SIALON at least from a surface of said cutting edge of said silicon nitride sintered body by a treatment with abrasive grains, said treatment being selected from the group consisting of blasting, barreling, and ultrasonic vibration, and applying a surface coating to said cutting edge surface from which said columnar $\beta$-$Si_3N_4$ and $\beta'$-SIALON has been removed, said surface coating having at least one layer of at least one component selected from the group consisting of carbide, nitride, carbonitride, nitride carbonate of Ti and $Al_2O_3$, said at least one layer having a thickness of at least 0.1 $\mu$m and not more than 10 $\mu$m, except for said layer of $Al_2O_3$ which has a thickness of at least 0.4 $\mu$m and not more than 10 $\mu$m.

5. The method of claim 4, comprising applying said surface treatment step to a sintered surface of said body having a 10 point mean surface roughness Rz of not more than 3 $\mu$m.

6. The method of claim 4, wherein said silicon nitride sintered body is so prepared that said sintered body contains 1 to 30 percent by weight of at least one component selected from the group consisting of carbide, nitride, carbo-nitride and boride of Ti.

7. The method of claim 4, wherein said sintering assistant is present within the range of 1 to 20 wt. %.

8. The method of claim 4, wherein said surface coating is applied to comprises an outermost surface layer of titanium nitride having a layer thickness of at least 0.1 $\mu$m and not more than 5 $\mu$m.

9. The method of claim 4, wherein said surface coating is applied to comprise an innermost coating layer made of a member selected from the group consisting of TiN and TiCN, said innermost coating layer having a layer thickness of at least 0.1 $\mu$m and not more than 1.0 $\mu$m.

* * * * *